Patented July 18, 1939

2,166,144

UNITED STATES PATENT OFFICE 2,166,144

PREPARATION OF SULPHOCARBOXYLIC ESTERS

Benjamin R. Harris, Chicago, Ill.

No Drawing. Application February 11, 1938, Serial No. 190,136

21 Claims. (Cl. 260—481)

My invention relates to novel and improved methods for producing salts of sulpho-carboxylic acid esters of alcohols and, in general, of lipophile materials.

The sulphocarboxylic acid esters are surface active or surface modifying agents and may be employed in the arts for many purposes, based upon their wetting, penetrating, laundering, detergent, lathering, sudsing, foaming, frothing, emulsifying and similar properties. To make use of these properties in the most desirable way, it is very often advantageous and, indeed, necessary to be able to prepare solutions, particularly aqueous solutions, which, at room temperatures or in the cold, contain at least several percent of such substances. In general, the sulphocarboxylic acid esters are prepared and marketed in the form of salts, usually the alkali metal salts. Such salts are, in general, possessed of relatively low solubility in cold water or in water at room temperature and this, therefore, seriously limits the field of utility of such agents.

I have found a very effective method whereby salts of esters of lower molecular weight sulphocarboxylic acids with lipophile materials, particularly higher molecular weight alcohols, which salts possess relatively poor solubility in cold water or water at room temperature, can be converted into different salts which have substantially greater or enhanced cold water solubility. Thus, for example, I have succeeded in converting salts of such esters, having a solubility of 0.1% or less in water at room temperature, into different salts with a solubility in the same medium of from 10% to 25% and even higher.

My invention is based upon the surprising discovery that base exchange substances such as zeolites, green sand and the like, possess the capacity for effecting a cationic replacement when solutions of salts of sulphocarboxylic acid esters are brought into contact therewith or are passed through a body thereof. While zeolites and the like have long been employed for effecting cationic replacements in connection with such inorganic salts as, for example, are encountered in connection with the softening of water or the like, it is indeed surprising that this action should take place in connection with such organic substances as those with which the present invention concerns itself, particularly since many of them are colloidal or semi-colloidal in character.

It will be seen, therefore, that my invention has its most important applicability, although not limited thereto, to the situation where a solution of at least several percent, preferably an aqueous solution containing from about 10% to 30%, of a salt of a sulphocarboxylic acid ester in the cold or at room temperature is desired and the particular salt at hand is inadequately soluble. I have found that, at least in most cases, those sulphocarboxylic acid ester salts which possess relatively low solubility in cold water or water at room temperature, say to the extent of 0.05% to 1.0%, dissolve to a substantial degree in hot water, in many instances to the extent of 10% to 15% or more. The resulting hot solution containing, for example, 10% to 15% of the ester salt is then passed into contact preferably with or through a bed of base exchange material containing replaceable cations of the salt desired. This results in the preparation of a solution containing a substantial percentage, for example, at least 5% to 8% or more, of the sulphocarboxylic acid ester in the form of a different salt which makes the ester remain in solution notwithstanding the fact that said solution may be cooled down to room temperature or much below or even further concentrated.

The esters whose treatment in accordance with the novel principles of my invention has given excellent results are the lower molecular weight sulpho-carboxylic acid esters of lipophile materials such as, for example, lower molecular weight sulphocarboxylic acid esters of higher molecular weight alcohols. Substances of this class are disclosed, among other places, in United States Patent Nos. 1,917,250; 1,917,255; 2,028,091; in British Patent No. 377,249 and in my copending application, Serial No. 174,655, filed November 15, 1937, and reference may be made thereto. These compounds may be made in various ways as, for example, by reacting a higher molecular weight alcohol such as lauryl alcohol with chloracetic acid or chloracetyl chloride and then reacting the resulting chloracetic acid ester of the alcohol with aqueous alkali sulphite such as potassium sulphite in accordance with the so-called Strecker reaction. This results in the production of a lower molecular weight sulpho-carboxylic acid ester of an alcohol, in the specific instance indicated, lauryl potassium sulpho-acetate having the formula

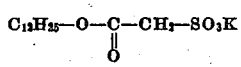

Other methods of preparing the sulpho-carboxylic esters may be employed as, for example, by esterifying a higher molecular weight alcohol, such as lauryl alcohol, with a lower molecular weight unsaturated acid such as butenoic acid—1 ($CH_3$—CH=CH—COOH) and then reacting the resulting ester with aqueous sodium bisulphite in accordance with the following reactions:

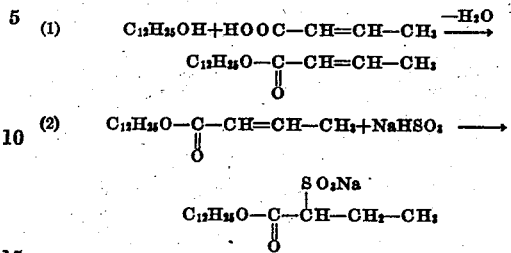

Still other methods of producing such agents are disclosed in the patents and applications referred to hereinabove.

The following examples will indicate clearly the manner of treating the sulpho-carboxylic acid esters in accordance with the principles of my invention. It will be understood, however, that such are merely illustrative and in no wise limitative of the scope of my invention. It will be evident that concentrations of materials employed may be varied within relatively wide limits, and the same is true of temperatures, times of treatment, and the particular sulphocarboxylic acid esters which are utilized in the process.

Example I

Lauryl potassium sulphoacetate is soluble in water at room temperature to the extent of only about 0.1%. To convert it to the magnesium salt which is considerably more soluble, the following procedure was carried out.

The base exchange material utilized is that known as "Cristallite" which is a fine sand comprising a synthetic aluminum changeable-ion hydrated silicate the exchange capacity of which, expressed in grains of calcium carbonate, was 12,000 to 15,000 grains of calcium carbonate per cubic foot of "Cristallite." In 100 cc. of loose "Cristallite" there were 38 cc. of spaces. The "Cristallite" was poured into a perpendicular glass tube, about 34 inches long and having an inside diameter of $1\frac{1}{16}$ inches, until the bed of "Cristallite" was about 17 inches high. The volume of the bed was 250 cc. The tubing was closed at the lower end with a one-hole rubber stopper fitted with a glass tube and a cock to control or arrest the flow of liquid. To prevent loss of the "Cristallite" and to retain the bed thereof intact, a fine mesh copper screen was utilized on which the bed rested.

About 400 cc. of a 20% aqueous solution of magnesium chloride was passed over the bed of "Cristallite" for about an hour, after which said solution was drained off and the thus treated "Cristallite" was washed carefully with about 400 cc. of cold water and finally with about 400 cc. of tap water at a temperature of approximately 65 degrees C. After substantially all of the water had been drained off, 300 cc. of a hot aqueous solution (65 degrees C.) containing 13% of lauryl potassium sulphoacetate were poured on the bed of "Cristallite" and allowed to stand for fifteen minutes. The solution was then drawn off slowly, the valve being adjusted to extend the flow over a period of about thirty minutes. The solution drawn off was brilliant, clear and limpid and did not freeze nor show any precipitation at 0 degrees C. Analyses showed that the resulting solution contained 13.1% of solids, and a magnesium determination employing standard methods showed that 67% of the theoretical amount of magnesium salt had been produced.

The times given above are illustrative and it is evident that adjustment may be required when the amount of materials treated is extensively modified.

Example II

Following the same general procedure as above, I produced the monoethanolamine salt of lauryl sulphoacetate in the following manner:

A 22½ monoethanolamine sulphate aqueous solution (400 cc.) was first utilized to impart monoethanolamine cations to the base exchange material, this solution being allowed to pass over the base exchange material for about 20 minutes until tests showed that an adequate introduction of monoethanolamine ions had been effected. The conditioning solution was then withdrawn and the "Cristallite" washed, as previously. A hot aqueous solution containing 15% of lauryl potassium sulphoacetate was then passed through the bed of base exchange material and a limpid, clear solution containing 15.7% of solids obtained. An aliquot portion of the solution was digested with boiling concentrated $H_2SO_4$, the $H_2SO_4$ evaporated off, and the sulphate ash weighed. The weight of this ash corresponded to 2.8% of lauryl potassium sulphoacetate on the total dry substance, showing susbtantially the complete conversion of the potassium salt into the monoethanolamine salt. The solution obtained made a very valuable base for the production of detergent compositions such as shampoos or hair washes.

Example III

Following the same general procedure as above, I produced the ammonium salt of lauryl sulphoacetate in the following manner.

A 20% aqueous solution of ammonium sulphate was initially passed through the base exchange material, observing the general conditions described hereinabove. A hot aqueous solution containing 14% of lauryl potassium sulphoacetate yielded, when passed through the base exchange material, a limpid solution of lauryl ammonium sulphoacetate having a concentration of 13.8% solids. This solution did not show any solidification or separation at room temperature, but it froze at a temperature of 0° C. When warmed to room temperature again, however, it thawed out to form again a clear solution. Analyses showed that the potassium salt was almost fully converted into the ammonium salt.

Example IV

Following the same method, a 15% hot solution of monostearine sulphoacetate (potassium salt), at 70 degrees C., was passed through a base exchange material containing triethanolamine cations, previously prepared by passing an aqueous solution containing 20% of triethanolamine sulphate through the base exchange material. A clear solution was obtained comprising essentially the triethanolamine salt of monostearine sulphoacetate, and this solution at room temperature and below remained clear, showing no evidence of precipitation.

Example V

In like manner, an alkali metal salt of hexadecyl sulpho-propionate was prepared containing 12% of solids, and at a temperature of 80 degrees C. was passed through a bed of base exchange material containing cations introduced therein by passing commercial triethanolamine sulphate in the form of a 20% aqueous solution therethrough. Commercial triethanolamine contains a substantial mixture of diethanolamine and monoethanolamine so that, when treated to form the sulphate, mono-, di- and triethanolamine sulphate were present. Accordingly, the ions of mono-, di- and triethanolamine were introduced into the base exchange material, and the solution of hexadecyl sulpho-propionate obtained by this method was a mixture of mono-, di- and triethanolamine salts with a slight amount of unconverted alkali metal salt. The final solution was limpid and clear at room temperature and had detergent and foaming properties making it suitable for use as a liquid detergent.

Example VI

The sulphoacetic acid esters of mixed alcohols obtained by the catalytic hydrogenation of coconut oil mixed fatty acids were produced in the form of the potassium salt thereof, and a hot 10% aqueous solution was passed through a bed of base exchange material containing ions of mono- di- and triethanolamine. A mixture of esters in the form of mono-, di-, and triethanolamine salts was produced, the solution thereof remaining clear and limpid at room temperature and considerably below room temperature. Substantially complete conversion to the ethanolamine salts was obtained.

It should be understood that the examples given hereinabove are merely illustrative both as to the type of sulphocarboxylic esters treated and the cations which exchanged in the treatment with the base exchange material. The compounds may be any lower molecular weight sulphocarboxylic acid esters of substances having esterifiable hydroxy groups, as the descriptive matter identifying such compounds amply shows. Furthermore, it will be clear that the sulphocarboxylic acid radical of said esters may contain other groups such as —OH, —NH$_2$, —NR$_2$,

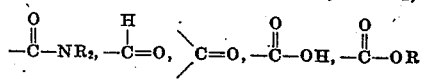

Cl, Br, I, F, —OSO$_2$H, —CN, —SCN, —SH, —NC, —PO$_3$H$_2$, —OPO$_3$H$_2$, —OR, where R is alkyl, aryl or cyclo-alkyl, such as methyl, ethyl, propyl, cyclo-hexyl, phenyl and the like.

The sulphocarboxylic acid esters with whose treatment the present invention is concerned are, in their preferred form, generally characterized by the presence of at least one higher molecular weight lipophile group containing preferably at least eight carbon atoms, usually, although not necessarily, aliphatic in character, and by the presence of at least one hydrophile or hydrophilic group in the form of a lower molecular weight sulphocarboxylic acid radical. Preferably, the lipophile and hydrophile groups are in a state of "balance" whereby the resulting compound has the property of reducing the spattering of margarine when used for frying. This concept of "balance" of lipophile and hydrophile groups is treated in considerable detail in the patent to Benjamin R. Harris, No. 1,917,250, issued July 11, 1933 and need not here be elaborated upon further. While this "balance" may be determined empirically by means of a margarine frying test, as described in said patent, those skilled in the art will, in most cases, readily be able to predict the existence of "balance" from merely an inspection of the structure of the molecule of the compounds themselves. As a general rule, the hydrophile and lipophile groups should preferably be at or near the ends or extremities of the molecule as, for example, in the case of lauryl potassium sulphoacetate wherein the lauryl group or, in other words, the lipophile group, is present at one end of the molecule, and the sulphoacetate or hydrophile group is present at the other end of the molecule. However, the invention is by no means so limited and in various instances the hydrophile group or groups may be present other than at an extremity of the molecule as, for example, in such compounds as monopalmitin sulpho-butyrate (sodium salt), dioctyl mono- or di-sulphosuccinate (sodium salt), distearyl mono- or di-sulphosuccinate (potassium salt), mono-palmitic acid ester of ethylene (or diethylene) glycol sulpho-propionate (sodium salt), etc.

It will be understood that the term "lipophile group" includes groups having a definite affinity for oils and fats and comprises, for example. alkyl, aralkyl, aryl, ether or ester groups containing preferably at least eight carbon atoms. The lipophile group possesses predominantly hydrocarbon characteristics and, in general, is derived from triglyceride fats and oils, waxes, mineral oils, other hydrocarbons, and the like.

In contra-distinction thereto, the term "hydrophile group" or "hydrophilic group" includes groups which possess an affinity for water and aqueous media and which, in the instant case, comprise lower molecular weight sulpho-carboxylic acids such as sulpho-acetates, sulpho-propionates, sulpho-succinates, sulphoglutarates, sulpho-butyrates, sulpho-valerates, sulpho-fumarates, and, in general, any sulpho-carboxylic acid containing less than 8 carbon atoms.

Among the sulpho-carboxylic acid ester salts, the treatment of which the present invention concerns, and various of which have excellent sudsing, foaming, frothing, lathering and detergent powers, are, as indicated, those prepared from higher molecular weight alcohols. The alcohols from which the sulpho-carboxylic acid esters may be prepared include, among others, the following: aliphatic straight chain and branched chain alcohols such as hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, branched chain octyl, decyl, dodecyl, tetradecyl, hexadecyl and octadecyl aliphatic alcohols as, for example, 2-ethyl hexanol-1, 2-n butyl octanol-1, 2-butyl tetradecanol-1, and, in general, the higher molecular weight saturated and unsaturated aliphatic straight chain and branched chain alcohols. Preferably, the alcohols which are utilized are those corresponding to the fatty acids occurring in tri-glyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. Other alcohols which may be employed are the cyclo-aliphatic or ali-cyclic alcohols such as the sterols, as, for example, cholesterol, iso-cholesterol, phytosterol, sitosterol, hydroaromatic alcohols such as abietol, and such unsaturated alcohols as linalool, citronellol, geraniol and the like and hydrogenated products of the foregoing. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, 1-hydroxy-stearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like.

The term "alcohols", as employed herein, is intended to include alcohols which may or may not contain other groups such as carboxylic, halogen, sulphonic, sulphate, or other radicals. The alcohols obtainable by substituting alkyl or acyl radicals, preferably of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols from which the sulpho-carboxylic acid esters may be produced. As examples of such alcohols may be mentioned, partially esterified or partially etherified sugars and sugar alcohols such as monolauric acid ester of sucrose, monostearic acid ester of dextrose, monopalmitic acid ester of mannitol, dicaproic acid ester of maltose, mono-octyl ether of sorbitol, monolauryl ether of pentaerythritol, monolauric acid ester of pentaerythritol, and the like; the monoglycerides and diglycerides, preferably of the higher fatty acids, as, for example, monolaurin, monomyristin, monostearin, distearin, diolein, dicaproin, monolauryl ether of glycerol, di-cetyl ether of glycerol, monostearic acid ester of diethylene glycol, monolauric acid ester of ethylene glycol, and the like.

It is, of course, obvious that the alcohols from which the sulpho-carboxylic acid esters may be produced may be prepared in accordance with any desired method. For example, many of these alcohols may be prepared by the so-called Bouveault and Blanc method or, alternatively, by the reduction or catalytic reduction with hydrogen of natural or hydrogenated animal or vegetable fats and oils, or mixtures thereof, in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols may be utilized in the preparation of the sulpho-carboxylic acid esters as, for example, the mixture of alcohols resulting from the hydrogenation of coconut oil or the free fatty acids of coconut oil. Lauryl alcohol comprises about 45% of the total alcohol mixture, the remaining alcohols running from $C_8$ to $C_{18}$. Again, mixtures of alcohols such as are present in the so-called sperm oil alcohols, as well as those present in wool-fat, may efficaciously be utilized. Indeed, these higher molecular weight alcohols are generally offered on the market in the form of mixtures of different alcohols. If desired for any specific purpose, special fractions which predominate in a certain particular higher molecular weight alcohol may be utilized or, if so desired, the products may be prepared from a single, substantially pure alcohol.

From the above, it will be clear that I am not limited with respect to the type of alcohol of which my compounds comprise sulphocarboxylic acid esters except that, for most purposes, considering the preferred uses of the compounds and not the functioning of my process, the alcohols should be of higher molecular weight. A similar situation obtains with respect to the character of the sulpho-carboxylic acid portion of the molecule.

Many of the sulphocarboxylic acid esters are very valuable agents for the preparation of shampoos, hair washes, and the like in view of their excellent sudsing, lathering, foaming and detergent properties. Concentrations of such substances as high as, for example, 10 or 15% in aqueous media produce excellent shampoos or hair washes. Many of the salts, for example, the sodium and potassium salts, however, are not adequately soluble so that a fully commercially satisfactory and readily acceptable shampoo product could be made by their use. These alkali metal salts, however, usually possess satisfactory solubility characteristics at elevated temperatures in that solutions in hot water as high as 10% to 25% or more in many cases are readily obtained. By first producing the hot-water-soluble salt by the most satisfactory methods considering sources of raw materials, yields and the like, and forming a solution in hot water of such salt, I have been able to convert such salt while in hot solution readily into the modified salt, such as a magnesium or triethanolamine salt or the like which is adequately soluble in cold water or water at room temperature.

In certain instances, it may be desirable simply to convert one salt of a sulpho-carboxylic acid ester into a different salt of said ester without regard to the particular advantages for the obtention of which my invention finds its present greatest importance and practicality. In such a case, for example, one may have a particular salt of a sulpho-carboxylic acid ester at hand and desire to convert it into another salt without regard to whether the desired salt is more or less soluble than the salt at hand. The novel teachings of my invention may be employed for such a purpose. However, as previously indicated, the present greatest utility of my invention appears to be in converting salts of sulpho-carboxylic acid esters which are normally possessed of relatively low solubility in cold water but are quite soluble in hot water into agents with substantially enhanced solubility in cold water.

The salts of the sulpho-carboxylic acid esters which may be produced by my invention are many and varied, the only requirement being that they be soluble in some measure in either hot or cold water. In general, salts of most inorganic and organic bases may be prepared. Among the inorganic salts are the alkali metal and alkaline earth salts, such as the sodium, potassium, calcium and magnesium salts as well as the salts of the so-called heavy metals. Ammonium and substituted ammonium or organic nitrogenous base salts may also efficaciously be prepared, included within which class are, for example, the salts of alcohol amines and alkylolamines including monoethanolamine, diethanolamine, triethanolamine, propanolamines, butanolamines, pentanolamines, glycerolamines, dimethyl monoethanolamine, diethyl monoethanolamine, dibutyl monoethanolamine, diethanol ethyl amine, cyclohexyl ethanolamine, alkylol polyamines such as alkylol derivatives of ethylene diamine, mono-methyl mono-ethanolamine, diethyl monoethanolamine, 1-amino-2, 3-propanediol, 1,2-diamino-propanol; alkylamines such as butylamine, dimethyl-amine, ethylene diamine, diethylene triamine, triethylene tetra-amine, mono-methyl ethylene diamine, monoethyl diethylene tetra-amine, hydrazine and substituted hydrazines, aromatic and heterocyclic bases and cyclic nitrogenous substances such as pyridine, quinaldine, piperidine, methylpyridine, and homologues and derivatives thereof, and, in general, primary, secondary and tertiary amines substituted or not with other radicals such as hydroxy, alkyl, aryl, cyclo-alkyl groups and the like; quaternary ammonium bases or hydroxides such as tetra-methyl ammonium hydroxide, tetraethyl ammonium hydroxide, quaternary ammonium bases with dissimilar alkyl radicals such as methyl-triethyl ammonium hydroxide, propyl-trimethyl ammonium hydroxide, mixtures of any two or more thereof, and the like. It will be understood that these organic nitrogenous bases may be employed in pure, impure or commercial form such as, for example, commercial triethanolamine which contains minor proportions of mono- and di-ethanolamine. The tabulation of specific salts given hereinabove is by no means meant to be exhaustive, but it affords to those skilled in the art more than an adequate exemplification of the practice of my invention.

It will be apparent that I may employ any of the base exchange substances, natural or synthetic, inorganic and organic, such as the well known zeolites, greensands, glauconites, harmotones, certain synthetic resins, etc. I prefer to employ a base exchange material with great exchange capacity and I have found that the product referred to previously and known as "Cristallite" is admirably suited for my purposes.

By the term "solution", as employed herein, it will be understood that it is intended to include not only true solutions but also so-called colloidal dispersions.

The term "higher", as employed herein, is intended to mean not less than eight carbon atoms and, concomitantly, the term "lower" will be understood to mean less than eight carbon atoms, unless otherwise specifically stated.

What I claim as new and desire to protect by Letters Patent of the United States:

1. The method of converting a salt of a lower molecular weight sulpho-carboxylic acid ester of a higher molecular weight alcohol which possesses relatively poor cold-water solubility into a different salt of said ester which possesses substantially enhanced cold-water solubility, which comprises preparing a relatively hot solution containing several percent of said first mentioned salt of said ester and then passing the same into contact with a base exchange material containing replaceable cations of said second-mentioned salt whereby an exchange of cations takes place to produce the salt having the enhanced cold-water solubility.

2. The method of converting an alkali metal salt of a lower molecular weight sulpho-carboxylic acid ester of a higher molecular weight alcohol, which salt possesses relatively low cold-water solubility, into a different salt of said ester which possesses substantially enhanced cold-water solubility, which comprises preparing a relatively hot aqueous solution containing several percent of said alkali metal salt of said ester and then passing the same into contact with a base exchange material containing replaceable cations of said different salt whereby an exchange of cations takes place to produce the salt having the enhanced cold-water solubility.

3. The method of claim 1 wherein the initial salt of the ester has a solubility in water at room temperature of the order of not substantially in excess of 1%, and the final salt of said ester has a solubility of water at room temperature of at least 5%.

4. The method of converting a salt of a sulphoacetate of a higher molecular weight alcohol, which salt possesses relatively poor cold-water solubility, into a different salt of said sulphoacetate which possesses substantially enhanced cold-water solubility, which comprises preparing a relatively hot aqueous solution containing at least 8% of said first-mentioned salt of said sulphoacetate and passing the same into contact with a base exchange material containing replaceable cations of said second-mentioned salt whereby an exchange of cations takes place to produce the salt having the enhanced cold-water solubility.

5. The method of claim 4 wherein the salt of the sulphoacetate comprises an alkali metal salt of a sulphoacetate of a higher molecular weight aliphatic alcohol.

6. The method of claim 4 wherein the finally produced salt of the sulphoacetate comprises an organic nitrogenous base salt.

7. The method of claim 4 wherein the finally produced salt is an alkylol amine salt.

8. The method of claim 4 wherein the finally produced salt is a salt of an alkylolamine selected from the group consisting of monoethanolamine, diethanolamine, triethanolamine, and mixtures thereof.

9. The method of converting a salt of a lower molecular weight sulphocarboxylic acid ester of an aliphatic alcohol containing from 12 to 18 carbon atoms which comprises passing an aqueous solution of said salt through a bed of a base exchange material containing cations of a salt to be produced, whereby to cause an exchange of cations and produce a salt different from the salt initially passed through the bed of said base exchange material.

10. In the treatment of a salt of a lower molecular weight sulphocarboxylic acid ester of a higher molecular weight alcohol, the step of passing an aqueous solution of such salt through a bed of a base exchange material containing the cations of a salt to be produced, whereby to cause an exchange of cations and produce a salt of said ester different from the salt passed through the bed of said base exchange material.

11. In the treatment of lower molecular weight sulphocarboxylic acid esters of higher molecular weight alcohols in the form of alkali metal salts thereof, the method of converting such of said salts which are relatively sparingly soluble in cold water to salts which are more soluble in cold water, which includes the step of passing a heated solution of said first-mentioned salts through a bed of a base exchange material which contains the cation of the said salt which is more soluble in cold water.

12. In the treatment of salts of lower molecular weight sulpho-carboxylic acid esters of alcohols containing from 12 to 18 carbon atoms and which salts are soluble in water at room temperature to the extent of less than 1%, the step of passing a hot solution of such salt of said ester over a bed of a base exchange material containing the cations of a salt to be produced, whereby to cause an exchange of cations and produce a salt of said ester which is soluble to the extent of at least 8% in water at room temperature.

13. In the treatment of alkali metal salts of sulphoacetates of higher molecular weight aliphatic alcohols, the method of converting such of said salts which are relatively sparingly soluble in cold water to such organic nitrogenous base salts which are appreciably more soluble in cold water, which includes the step of passing a hot aqueous solution of the alkali metal salt through a bed of a base exchange material which contains the organic nitrogenous base cations corresponding to the said salt which is appreciably more soluble in cold water.

14. In the treatment of alkali metal salts of sulphoacetates of fatty alcohols formed by carboxylic reduction of the mixed acids of coconut oil, the step of passing such salts through a bed of base exchange material containing an exchangeable cation of an organic nitrogenous base whereby to form a nitrogenous base salt of said sulphoacetate.

15. In the treatment of sulphoacetates of higher molecular weight alcohols consisting predominantly of lauryl alcohol, the step of passing an alkali metal salt thereof through a bed of base exchange material containing an exchangeable ethanolamine cation whereby to produce an ethanolamine salt of said sulphoacetate.

16. In the treatment of a relatively low molecular weight sulphocarboxylic acid ester of a relatively high molecular weight alcohol, the step of passing a solution of a salt of such ester over a base exchange material to produce a different salt of said ester.

17. In the treatment of a sulphoacetate of a relatively high molecular weight alcohol, the step of passing a solution of a salt of such ester over a base exchange material to produce a different salt of said ester.

18. In the treatment of a relatively low molecular weight sulpho-carboxylic acid ester of lauryl alcohol, the step of passing a solution of a salt of such ester through a bed of a base exchange material to produce a different salt of said ester.

19. The method of converting an alkali metal salt of lauryl sulphoacetate into another salt thereof which comprises passing a solution of said alkali metal salt of lauryl sulphoacetate through a bed of a base exchange material which contains replaceable cations other than those in said solution whereby to recover a solution of another salt of lauryl sulphoacetate.

20. The method of converting an alkali metal salt of lauryl sulphoacetate into a salt which is soluble at least to the extent of 8% in water at room temperature, which comprises making a hot aqueous solution containing at least 8% of said alkali salt, and passing said solution, while hot, through a bed of base exchange material containing relaceable cations of a more soluble salt whereby to replace the alkali metal ion with the cations of the base exchange material and form a solution of a salt of lauryl sulphoacetate which, in the concentration present, will remain clear at room temperature.

21. The method of converting an alkali metal salt of a sulphoacetate of lauryl alcohol into an alkylolamine salt thereof, which comprises forming a hot aqueous solution containing several percent of said alkali metal salt, and passing said solution, while hot, through a bed of base exchange material containing replaceable alkylolamine ions, whereby to effect an exchange of cations and obtain an alkylolamine salt which is soluble at least to the extent of several percent in cold aqueous media.

BENJAMIN R. HARRIS.